Figure 1:
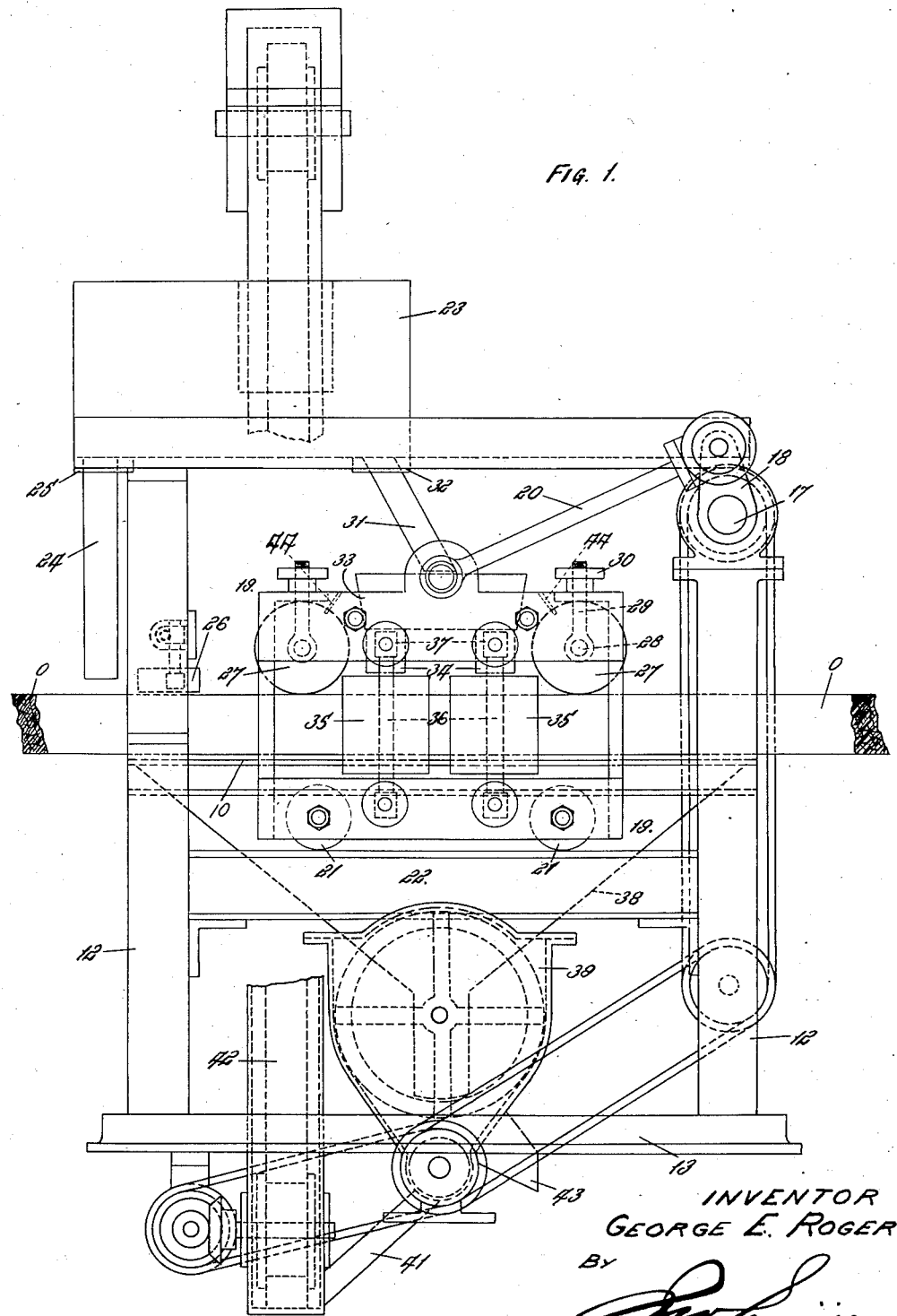

Jan. 21, 1936. G. E. ROGERS 2,028,523
APPARATUS FOR THE MANUFACTURE OF BRICKS OR THE LIKE
Filed March 7, 1935 3 Sheets-Sheet 1

INVENTOR
GEORGE E. ROGERS
By
ATTY.

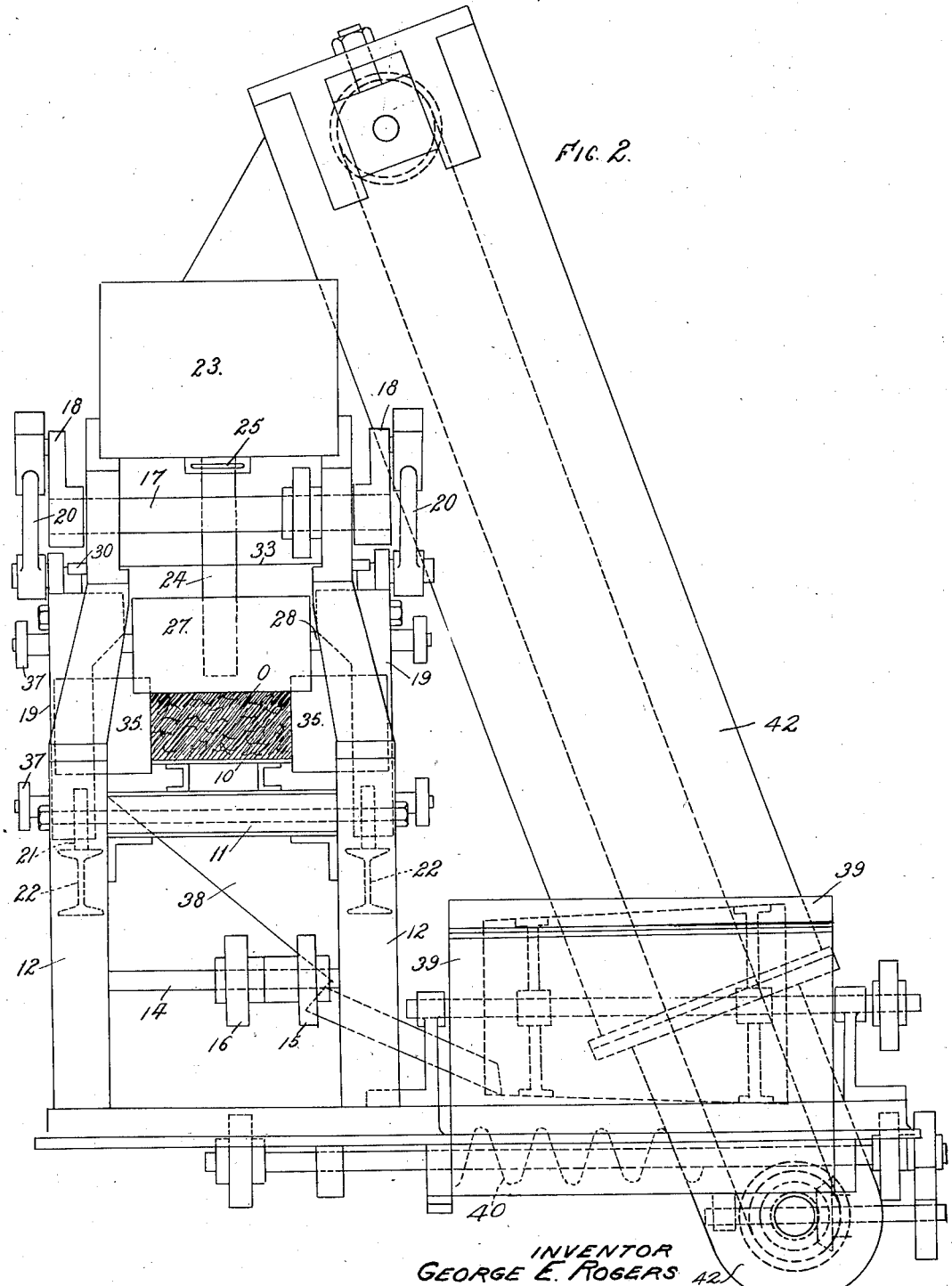

Jan. 21, 1936.          G. E. ROGERS          2,028,523
APPARATUS FOR THE MANUFACTURE OF BRICKS OR THE LIKE
Filed March 7, 1935          3 Sheets-Sheet 3
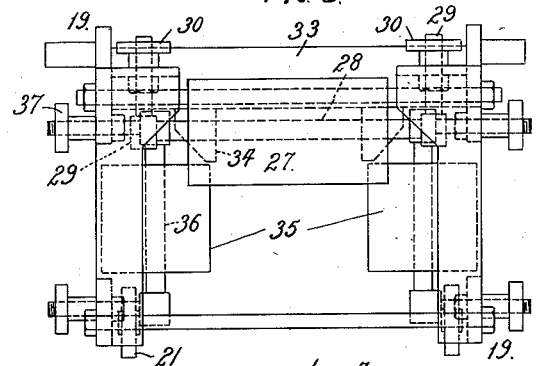
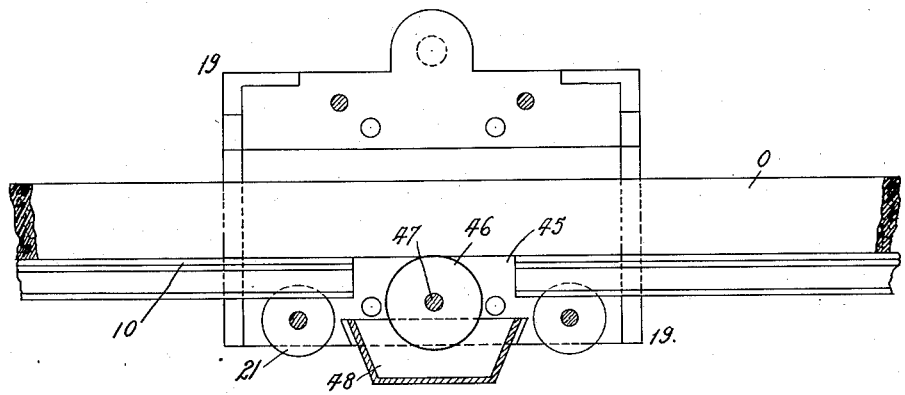
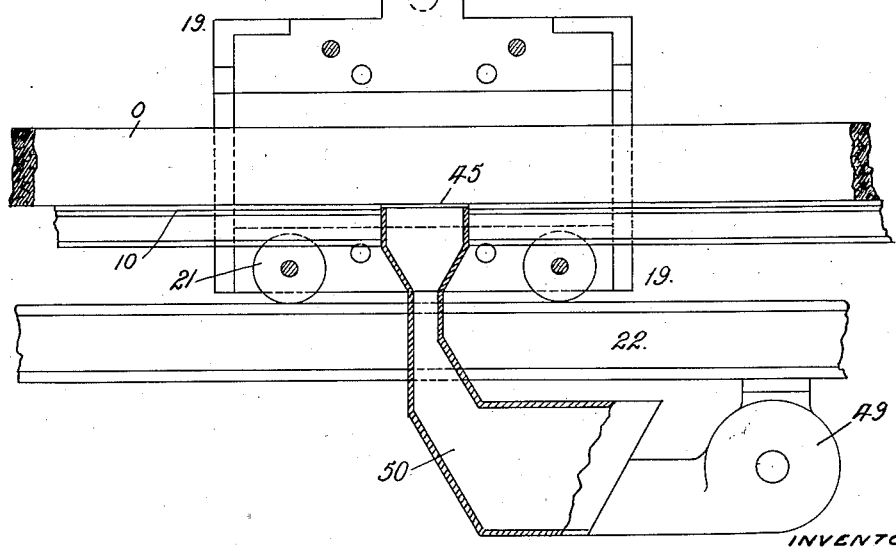
INVENTOR
GEORGE E. ROGERS Patented Jan. 21, 1936

2,028,523

UNITED STATES PATENT OFFICE 2,028,523

APPARATUS FOR THE MANUFACTURE OF BRICKS OR THE LIKE

George Ernest Rogers, Moreton, England

Application March 7, 1935, Serial No. 9,840
In Great Britain March 17, 1934

6 Claims. (Cl. 25—1)

This invention relates to the manufacture of bricks or the like, and is concerned with an apparatus for the facing of shaped strips of soft clay, shale or the like material before drying and burning.

Among the objects of the invention are to simplify apparatus for the above purpose, and to cheapen the cost of production of such apparatus.

According to this invention there is provided an apparatus for facing shaped strips of soft clay and the like comprising in combination means for supplying a facing material such as sand to one or more faces of the clay strip, roller means for embedding the facing material in the clay strip, means for supporting the roller means for rotation in and by contact with the said strip due to relative movement between the strip and the roller means, means for spreading the facing material on the strip, and means for reciprocating the roller means in contact with the clay strip. Conveniently the roller means is in the form of cylindrical brushes adjustable towards and away from the clay strip, whereby the depth to which the facing material is embedded may be varied, and if required a scraper device such as a comb may be used in conjunction with the brushes for freeing the bristles from clogging during the embedding operation.

One example of the invention is illustrated in the accompanying drawings with reference to the sand facing of a clay-strip whereon:—

Figure 1 is a front elevation,

Figure 2 a side elevation of the apparatus,

Figure 3 is a detail view of the reciprocable carriage for the rotary brushes shown in Figures 1 and 2, and Figures 4 and 5 show modifications of the invention.

The apparatus comprises a supporting table 10 for the clay 0, carried on a horizontal member 11 supported by standards 12 mounted on a bed plate 13. A shaft 14, which it may be assumed is driven by a motor or the like external to the apparatus, is mounted in bearings carried from a pair of the standards 12. This shaft carries for rotation with it two pulleys 15 and 16, the rotation of the pulley 15 being transmitted to a shaft 17 carrying cranks 18 which transmit a reciprocating motion to a carriage 19 through a connecting rod 20. The carriage is mounted on wheels 21 which run on rails 22 carried by the standards 12.

The sand for facing the upper surface of the clay is fed from a hopper 23, by way of a conduit 24 controlled by a slide-valve 25. The sand is spread over the surface of the clay by a spreader-device 26 (under which the clay passes) and is subsequently embedded in the clay by cylindrical brushes 27 mounted for rotation on spindles 28 carried from the carriage 19 by hangers 29 adjustable vertically by rotation of the nuts 30 so that the pressure with which the brushes bear on the clay can be regulated.

For facing the sides of the clay, sand is supplied from the hopper 23 by a conduit 31, controlled by a slide valve 32, to an auxiliary hopper 33 carried by and moving with the carriage 19. The sand is fed from the auxiliary hopper by conduits 34, between the sides of the clay and cylindrical brushes 35 carried for rotation on vertical spindles 36 mounted on the carriage 19 and adjustable in a horizontal plane by rotation of the nuts 37, towards and away from the sides of the clay so that the pressure with which these brushes bear on the clay can be regulated.

For collecting surplus sand a chute 38 is located in the lower part of the apparatus. The sand passes down this chute to a screening device 39 from which the screened sand is fed by an Archimedean screw 40 to a pipe 41 down which it passes to an elevator gear 42 which returns it to the hopper 23. This elevator gear may conveniently consist of a travelling endless belt provided with buckets for picking up and transporting the sand. Foreign matter separated from the sand in the screening device is discharged therefrom by way of a chute 43. Both the screening device and the elevator are driven from the pulley 16 on the shaft 14. A wire comb 44 is fixed on the carriage 19 in relation to the rotatable brushes to clear the bristles during the facing operation.

In operation the length of clay is fed along its supporting table between the horizontal and vertical brushes which are reciprocated over its surfaces so that the sand which has been fed onto the clay is embedded in the surface thereof to a depth regulated by adjustment of the pressure with which the brushes bear on the clay.

If it is desired to face the underside of the clay the apparatus is modified as shown in Figure 4 or Figure 5. In Figure 4 a gap 45 is provided in the supporting table 10 through which a brush 46, mounted for rotation on a shaft 47 carried from the carriage 19, acts on the clay strip, the brush picking up sand from a hopper 48. In Figure 5 the facing material is thrown onto the underside of the clay strip through the gap 45 by an air blowing device 49 which forces air into a hopper 50 containing the facing material.

It will be appreciated that modifications may be made in the above described example without departing from the nature of the invention as herein ascertained. For example, the method of reciprocating the brush-carrying carriage may be electrical, hydraulic or pneumatic. Furthermore, the brushes which make contact with the clay to be faced may be given a "staggering" motion for the purpose of spreading the facing material and any number of brushes may be used for operating on the clay surface. Furthermore the brush embedding means hereinbefore described may be replaced by a smooth or rough or pattern roller depending on the kind of surface required in the finished work. The bearings which support the brushes or rollers may be made so that the substitution of brushes for rollers or vice versa can be easily effected.

What is claimed is:—

1. Apparatus for facing shaped strips of soft clay comprising in combination a frame having a strip-supporting table, means for supplying facing material to at least one face of the clay strip, means for spreading the said facing material on the strip, carriage guides operatively connected to the frame, a reciprocable carriage on the said carriage guides and having roller means rotatably supported therein, and arranged to bear on the clay strip, and means for reciprocating the said carriage whereby the facing material is rolled into the strip.

2. Apparatus for facing shaped strips of soft clay comprising in combination a frame having a strip-supporting table, means for supplying facing material to a horizontal and at least one vertical face of the said strip, means for spreading the said facing material on the horizontal face of the strip, carriage guides operatively connected to the said frame, a reciprocable carriage on the said carriage guides and having horizontal and vertical bearings, horizontal and vertical rollers in the said bearings and arranged to make contact with a horizontal and at least one vertical face of the strip, and means for reciprocating the said carriage whereby the rollers embed the facing material in the strip.

3. Apparatus for facing shaped strips of soft clay comprising in combination a frame having a strip-supporting table, means for supplying facing material to a horizontal and at least one vertical face of the said strip, means for spreading the said facing material on the horizontal face of the strip, carriage guides operatively connected to the said frame, a reciprocable carriage on the said carriage guides and having horizontal and vertical bearings, means for adjusting the said horizontal and vertical bearings towards and away from the strip, horizontal and vertical rollers in the said bearings and arranged to make contact with a horizontal and at least one vertical face of the strip, and means for reciprocating the said carriage whereby the rollers embed the facing material in the strip.

4. Apparatus for facing shaped strips of soft clay comprising in combination a frame having a strip-supporting table, means for supplying facing material to at least one face of the clay strip, means for spreading the said facing material on the strip, carriage guides operatively connected to the frame, a reciprocable carriage on the said carriage guides, and having at least one cylindrical brush rotatably supported therein, and means for reciprocating the said carriage whereby the facing material is embedded into the strip.

5. Apparatus for facing shaped strips of soft clay comprising in combination a frame having a strip-supporting table, means for supplying facing material to at least one face of the clay strip, means for spreading the said facing material on the strip, carriage guides operatively connected to the frame, a reciprocable carriage on the said carriage guides and having at least one cylindrical brush rotatably supported therein, at least one scraper means for clearing the said brush against clogging, and means for reciprocating the said carriage whereby the facing material is embedded into the strip.

6. Apparatus for sand facing a strip of soft clay comprising in combination a frame having a strip-supporting table, a sand hopper located above the said table, conduits leading from the said hopper to the clay strip, means for spreading the sand on the strip, carriage guides operatively connected to the frame, a saddle-shaped carriage located on the said carriage guides, vertical and horizontal bearings operatively connected to the said carriage, rotatable cylindrical brushes located in the said bearings and arranged to bear on the horizontal and vertical faces of the clay strip, and means for reciprocating the said carriage relatively to the clay strip whereby the sand is embedded in the face of the strip.

GEORGE ERNEST ROGERS.